United States Patent [19]

Siol et al.

[11] Patent Number: 4,814,207

[45] Date of Patent: Mar. 21, 1989

[54] METHOD FOR MAKING PROTECTIVE COATINGS

[75] Inventors: Werner Siol; Erwin Felger, both of Darmstadt; Werner Arnold, Schaafheim, all of Fed. Rep. of Germany

[73] Assignee: Röhm GmbH, Darmstadt, Fed. Rep. of Germany

[21] Appl. No.: 46,257

[22] Filed: May 4, 1987

[30] Foreign Application Priority Data

May 14, 1986 [DE] Fed. Rep. of Germany ....... 3616176

[51] Int. Cl.$^4$ .............................................. B05D 3/02
[52] U.S. Cl. ................................ 427/393.5; 427/160; 427/164
[58] Field of Search .................... 427/160, 164, 389.7, 427/393.5; 264/259, 230

[56] References Cited

U.S. PATENT DOCUMENTS

| | | | |
|---|---|---|---|
| 3,968,305 | 7/1976 | Oshima et al. | 428/334 |
| 3,968,309 | 7/1976 | Matsuo et al. | 428/409 |
| 4,339,474 | 7/1982 | Kishida et al. | 427/44 |
| 4,576,870 | 3/1986 | Liebler et al. | 428/515 |
| 4,612,358 | 9/1986 | Besecke et al. | 526/259 |

FOREIGN PATENT DOCUMENTS

| | | |
|---|---|---|
| 2164716 | 7/1972 | Fed. Rep. of Germany . |
| 2455715 | 6/1975 | Fed. Rep. of Germany . |
| 2928512 | 1/1981 | Fed. Rep. of Germany . |
| 1466405 | 3/1977 | United Kingdom . |

OTHER PUBLICATIONS

Chem. Abstr, 94, 141385, (1981).
Op. Cit., 3rd Edn., Suppl. 1970, pp. 177–181.
Swern, Organic Peroxides, vol. 1, pp. 68–73, (1970), John Wiley & Sons.
Op. Cit., vol. 2, pp. 863–867, (1971).

*Primary Examiner*—Janyce Bell
*Attorney, Agent, or Firm*—Curtis, Morris & Safford

[57] ABSTRACT

A method for applying a coating of a scratch resistant and weather resistant film to a shaped article by applying to said article a thin film of a mixture of a free radically polymerizable monomer having at least two polymerizable olefinic bonds, a peroxide initiator having a half life of less than two minutes at 100° C., and an ultraviolet stabilizer, and then curing said film by heating it to a temperature above 70° C.; coated shaped articles made by this method.

11 Claims, 20 Drawing Sheets

METHOD FOR MAKING PROTECTIVE COATINGS

The present invention relates to a method for coating shaped articles, especially those made of synthetic resin such as organic glasses, said coating being a cured thin film produced by the polymerization of polyfunctional acrylic and/or methacrylic compounds and having high scratch resistance even under extreme weather conditions.

THE PRIOR ART

According to German patent publications No. 21 64 716 and 24 55 715, the polymerization of polyfunctional acrylic and/or methacrylic systems can be carried out with thermally decomposing polymerization initiators, i.e. the usual oil soluble peroxides and azo compounds, or by radiation, for example with ultraviolet radiation in the presence of photoinitiators. Ultraviolet initiation is preferably employed because it can be effected also in the presence of atmospheric oxygen. According to German patent publication No. 29 28 512, such ultraviolet initiated polymerization, carried out at temperatures between 70° C. and the glass transition temperature of the resin being coated, yields coatings with improved adhesion.

However, the use of panels so coated has shown that the resistance to weathering of the crosslinked polymer film is insufficient. This is probably due mainly to the effect of unreacted residues of UV initiator in the coating.

THE OBJECT AND THE INVENTION

It was thus sought to improve the weatherability of the scratch resistant coating of polymerized, largely polyfunctional acrylates and methacrylates on a shaped article, and particularly one made of a thermoplastic or thermoelastic resin, the polymerization being carried out without the use of a UV-active compound. The method of choice was to be one which according to German patent publication Nos. 21 64 716 and 24 55 715 permits the use of one of the thermally decomposing polymerization initiators there listed.

Attempts to produce a cured film of polyfunctional acrylic monomers in the manner indicated in the specification of German patent publication No. 24 55 715 in the presence of the thermal polymerization initiators there described, such as azobisisobutyronitrile, azobis-2,4-dimethylvaleronitrile, benzoyl peroxide, or di-tert-butyl peroxide and other similar thermal polymerization initiators such as tert-butyl peroctoate or dilauroyl peroxide, showed that the coatings so obtained were not even scratch resistant. The coatings were produced on an acrylic glass panel with a monomer blend of 75 parts by weight of trimethylolpropane triacrylate and 20 parts by weight of pentaerythritol tetraacrylate and 5 parts by weight of one of the above mentioned initiators by polymerizing for 10 minutes at 100° C. under a nitrogen atmosphere.

Surprisingly, it has now been found that highly scratch and weather resistant coatings can be obtained on shaped resin articles by polymerizing the same monomers or monomer blends together with an ultraviolet stabilizer in the presence of peroxide initiators, if initiators having a half-life of less than two minutes at 100° C., and particularly dialkyl peroxydicarbonates, are used as thermal peroxide polymerization initiators and if the polymerizable monomer blend contains not more than 30 and preferably not more than 15 percent by weight of methacrylate monomers.

The invention thus relates to a method for making a scratch resistant and weather resistant coating on a shaped article by applying to it a coating of a monomer capable of undergoing free radical polymerization and containing at least two polymerizable carbon-carbon double bonds, i.e. ethylenic or olefinic bonds, either alone or in admixture with other monomers containing a polymerizable double bond, and curing the coating by heating it to a temperature of over 70° C., said coating being cured in the presence of a stabilizer against ultraviolet light with a peroxide initiator having a half-life of less than two minutes at 100° C. and in the presence of an ultraviolet stabilizer.

Aliphatic peroxydicarbonates are particularly effective peroxide initiators in accordance with the invention.

This is a most unusual approach since these peroxides are not commonly used in the preparation of the polyacrylic or polymethacrylic compounds or of polyvinyl compounds such as polyvinyl esters.

While dialkyl peroxydicarbonates are being used increasingly as so called low temperature initiators, either alone or in combination with the other known initiators which decompose at higher temperatures, for example dilauroyl peroxide, particularly in the production of polyvinyl chloride, they there serve to shorten considerably the long inhibition time encountered when the usual initiators are used. However, this effect does not come into play in the polymerization of acrylates, and especially of polyfunctional acrylates, with such commonly used polymerization initiators as dilauroyl peroxide or azodiisobutyronitrile or tert-butyl peroctoate.

A definitive interpretation of the surprising effect of the present invention cannot be given. The structure of the free radicals generated upon decomposition of the peroxydicarbonates, and hence their reactivity, may possibly be a factor in the formation of a hard acrylate film.

The finding that the amount of methacrylates should be less than 30 weight percent, and preferably less than 15 weight percent, may conceivably be similarly interpreted.

Accelerated indoor weathering tests with xenon arc units have shown that coatings produced in accordance with the invention on extruded acrylic glass, for example, have relatively good resistance to weathering, in contrast to coatings comprising the same monomers but produced with ultraviolet initiators.

The weatherability of coatings in accordance with the invention, produced thermally from polyfunctional acrylates or methacrylates, can be substantially improved by the concurrent use of ultraviolet stabilizers and antiaging agents, and especially of UV stabilizers incorporated during the polymerization process.

The coatings produced in accordance with the invention should comprise at least 30 percent by weight of a polyfunctional acrylic compound of the type mentioned above, for example, and less than 30 weight percent of one or more further compounds capable of being incorporated into the polymer. Compounds which have proved suitable for use as a comonomer include acrylic acid and/or methacrylic acid, for example.

ADVANTAGES OF THE INVENTION

A comparison of the resistance to scratching of the coatings produced in accordance with the invention with that of prior art polysiloxane based scratch resistant coatings on resin surfaces has shown that the scratch resistance of the novel coatings is just as good, if not better. The novel coating can be produced much more economically since it will cure within a few minutes, whereas the polysiloxane coating will take several hours to cure at comparable curing temperatures. With regard to weatherability, the novel scratch resistance coating is significantly superior to one produced with ultraviolet initiators.

A special advantage of the coating in accordance with the invention is that this scratch resistance film will adhere to practically any substrate. For example, this coating can even be applied to such synthetic resins as polyethylene/polypropylene. In contrast to coating with ultraviolet initiators, here the UV stabilizers can be chosen at will and they can therefore be optimally adapted to the substrate to be protected.

PRACTICE OF THE INVENTION

A scratch resistant coating is desirable on shaped articles generally, but particularly on shaped synthetic resin articles which have a hard, glossy surface but are easily scratched. Among the resins having little surface hardiness are those which are only slightly or weakly crosslinked and which, in a thermoplastic or thermoelastic state, can be processed into shaped articles. For example these include polymethyl methacrylate, copolymers of methyl methacrylate and acrylonitrile, polystyrene, impact resistant styrene copolymers, polyacetal, polyethylene, polypropylene, polyvinyl chloride, polycarbonate, cellulose, or bisphenol-A. However, a scratch resistant coating can also be applied to shaped articles made of other materials, for example wood, metal, etc.

Coating of the resins according to the invention is effected on the shaped article in its final shape, for example on a finished injection molded part, since the highly crosslinked scratch resistant film is not thermoplastically or thermoelastically deformable. The coating will tolerate limited elastic bending of the shaped resin article. A preferred object of the invention is the coating of flat panels or continuously produced flat strip and hollow section plates or sheets. Coating may directly follow the extrusion process, preferably as a continuous operation. However, the coating of bulk produced injection molded parts is also preferred.

Coating compositions which in accordance with the invention cure with peroxydicarbonate to a highly crosslinked scratch resistant and weather resistant coating contain as the essential ingredient one or more acrylic and/or methacrylic compounds capable of undergoing free radical polymerization and containing at least two and preferably three or more polymerizable carbon-carbon double bonds. The preferred tri- or higher-functional monomers are acrylic acid esters of at least trihydric alcohols such as glycerine, trimethylolpropane, 1,2,4-butanetriol, 1,2,6-hexanetriol, pentaerythritol, diglycerol, or dipentaerythritol. Preferred polyfunctional monomers are trimethylolpropane triacrylate, pentaerythritol triacrylate and/or tetraacrylate, and 1,2,6-hexanetriol triacrylate. The amount of methacryloyl groups should be kept to a minimum. An amount of not more than 30, particularly one of not more than 15, percent by weight of methacryl monomers is preferred.

The concurrent use of monomers containing one or two double bonds capable of undergoing free radical polymerization is advantageous to improve the handling of the generally highly viscous, at least trifunctional monomers and the properties of the coating, for example to improve flexibility. Illustrative of suitable comonomers having a polymerizable double bond are styrene, acrylonitrile, acrylates or methacrylates which have from 1 to 10 carbon atoms in the ester portion and which may further be substituted in the ester portion, for example with OH groups, and particularly acrylic acid and methacrylic acid. Especially preferred, however, are monomers having a boiling point above 140° C. and an acrylic group as polymerizable unit.

Examples of suitable difunctional comonomers are 1,4-divinylbenzene or the diacrylates and dimethacrylates of ethylene glycol, diethylene glycol, tetraethylene glycol, 1,2-propylene glycol, 1,4- or 1,3-butanediol, dimethyl propanediol, 1,6-hexanediol, neopentyl glycol and 2-ethylhexanediol-2,3. Here, too, the amount of methacrylates should be kept to a minimum.

The improved weather resistance of the scratch resistant coating in accordance with the invention is achieved by the incorporation of ultraviolet stabilizers, for example nonpolymerizable UV stabilizers of the type well known as additives for synthetic resin and listed, for example, in *Ullmanns Enzyklopaedie der technischen Chemie* ("Encyclopedia of Technical Chemistry"), 4th ed., vol. 15, pp. 253–260. These materials include compounds of the structure

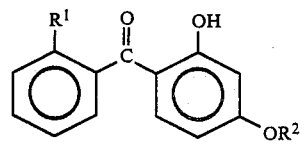

wherein $R^1$ is H and $R^2$ is alkyl, particularly ethyl, n-octyl, or n-dodecyl, or wherein R is OH or COOH and $R^2$ is $CH_3$, sold under the trade name "Cyasorb" or "Chimassorb."

Other compounds have the structure

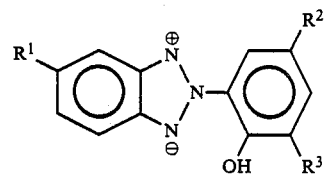

wherein $R^1$ and $R^3$ are H and $R^2$ is $CH_3$ or wherein $R^1$ is H or Cl and one or both of $R^2$ and $R^3$ are tertiary alkyl groups creating sterically hindered structures, such tert-butyl or tert-amyl, sold under the trade name "Tinuvin."

Still other compounds are sold under the trade name "Uvinul" and have the structure

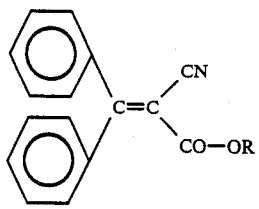

where R is ethyl or 2-ethylhexyl.

Yet other compounds have the structure

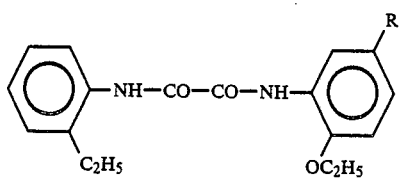

where R is H or tert-butyl, sold under the trade name "Sanduvor."

Other known UV absorbers are resorcinolmonobenzoate,

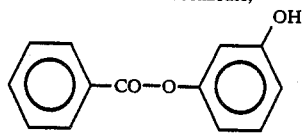

4-n-octylphenylsalicylate,

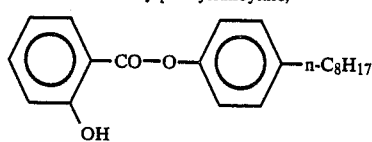

Still other UV stabilizers contain polymerizable unsaturated groups and can be incorporated by polymerization into the structure of the polymer to be stabilized. Polymerizable UV absorbing monomers suitable for use in the invention are those taught in U.S. Pat. No. 4,612,358, incorporated herein by reference, having the formula

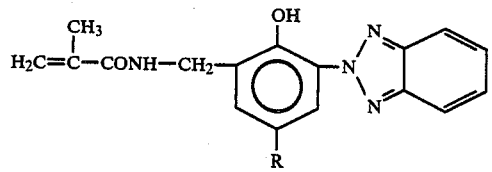

wherein R is $C_4$–$C_{12}$ alkyl wherein not more than 6 carbon atoms are present in a linear chain, particularly 2-(2'-hydroxy-3'-methacrylamidomethyl-5'-tert-octylphenyl)benzotriazole.

Other such monomers are taught in U.S. Pat. No. 4,576,870, incorporated herein by reference, and include monomers of the formula

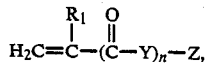

wherein $R_1$ is hydrogen or methyl, n is 0 or 1, Y is oxygen or —$NR_2$— wherein $R_2$ is hydrogen or ($C_1$–$C_6$) alkyl, and Z is (a) a 2-hydroxybenzylphenyltriazole of the formula

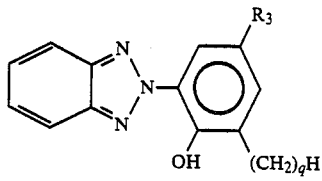

wherein $R_3$ is hydroge or ($C_1$–$C_{12}$) alkyl and q is 0 or an integer from 1 to 4, or Z is such a compound which is halogen substituted or is such a compound wherein benzotriazole is substituted by ($C_1$–$C_4$) alkyl, wherein such Z may be linked into the monomer by way of the hydroxy oxygen if n is 0, by way of —$(CH_2)q$ where q is other than 0, or directly by way of phenyl when q is 0;

(b) a 2-hydroxybenzophenone or 2-hydroxyacetophenone of the formula

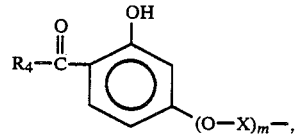

wherein m is 0 or 1, X is ($C_1$–$C_4$)-alkylene or such alkylene substituted by hydroxy, and $R_4$ is phenyl or methyl;

(c) an alpha-cyano-beta, beta-acryloyloxy compound of the formula

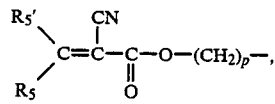

wherein p is an integer from 1 to 4 and $R_5$ and $R_5'$ are independently phenyl or phenyl substituted by ($C_1$–$C_4$)-alkyl;

(d) a benzoic acid ester of the formula

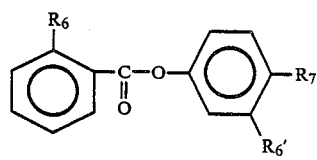

wherein one of $R_6$ and $R_6'$ is hydroxy and the other is hydrogen, $R_7$ is hydrogen or ($C_1$–$C_{10}$)-alkyl, and this Z may be linked into the monomer by way of any unsubstituted position in either phenyl;

(e) an oxananilide of the formula

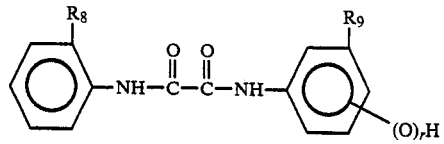

wherein $R_8$ and $R_9$ are hydrogen, ($C_1$–$C_8$)-alkyl, or ($C_1$–$C_8$)-alkoxy, r is 0 or 1, and this Z may be linked into the monomer by way of the hydroxy oxygen when r is 1 and when n is 0 or by way of any unsubstituted position in either phenyl when r is 0 or 1.

(f) when n is 0, para-aminobenzyoyloxy of the formula

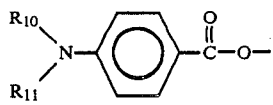

wherein $R_{10}$ and $R_{11}$ are hydrogen or $(C_1-C_6)$-alkyl and 6,8-dialkyl-4-oxo-5-chromanyl of the formula

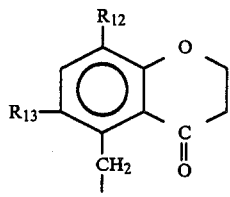

wherein $R_{12}$ and $R_{13}$ are $(C_1-C_4)$-alkyl.

The mixing ratio of the various types of monomers influences both the viscosity of the coating mixture and the properties of the cured film. The tri- and higher-functional monomers result in the highest scratch resistance but also in pronounced brittleness. Their amount is advantageously 30 percent by weight or greater. The amount of bifunctional monomers, which also contribute to improved scratch resistance of the resin coated with them, together with any monofunctional comonomers, generally should not exceed 70 percent by weight. Surprisingly, the scratch resistance of coatings which contain up to 30 weight percent of acrylic acid and/or methacrylic acid, for example, is not poorer. The UV stabilizers ae used in amounts from 1 to 30 percent, and more particularly from 5 to 20 percent, by weight of the monomers going into the coating.

As the thermal initiator, the coating composition contains one or more peroxide initiators having a half-life of less than two minutes at 100° C. *Ullmanns Enzyklopadie der technischen Chemie,* 3rd ed., Supplement 1970, pp. 177-181, preferably aliphatic peroxydicarbonates such as diethyl peroxydicarbonate, dichloroethyl peroxydicarbonate, diisopropyl peroxydicarbonate, diisobutyl peroxydicarbonate, di-2-ethylhexyl peroxydicarbonate, dicyclohexyl peroxydicarbonate, or dicyclohexyl peroxydicarbonates substituted with alkyl, particularly methyl, groups. (In this connection, see Swern, *Organic Peroxides,* Vol. 1 [1970], pp. 68-73, and Vol. 2 [1971], pp. 863-867, John Wiley & Sons.) The peroxydicarbonates are used in amounts ranging from 0.1 to 10, and more particularly from 1 to 7, percent by weight of the total coating composition. In addition, other known thermal peroxide inititors, such as dilauroyl peroxide, tert-butyl peroxypivalate, or dibenzoyl peroxide, may be used in minor amounts, that is from 0 to 20 percent by weight of the peroxide initiator having a half-life of less than two minutes at 100° C.

To bring about a partial dissolution of the substrate for the purpose of improving adhesion, organic solvents such as methyl ethyl ketone may also be added to the coating composition. In a particularly preferred embodiment, the polyfunctional monomers, which form a highly reactive mixture when combined with the initiator decomposing at low temperature, are mixed with the initiator only shortly before the composition is applied, for example in a mixing nozzle or in a multiple component spray nozzle. When solvents are used, the initiator is dissolved in them. When the composition is applied without a solvent, the initiator is dissolved in the monomer or monomers which are slowest to react, preferably in methacrylates. Antioxidants or polymers such as polyester resins may be used as further additives.

The coating composition may be applied to the shaped articles, for example of resin, by various techniques such as dipping, pouring, or spraying, either discontinuously or continuously, in coating thicknesses ranging from 1 to 100 microns and preferably from 2 to 50 microns. For example, the continuous production of plastic panels by extrusion may be followed by continuous coating of the panels, which may still be at elevated temperatures, but which should be below the glass transition temperature of the plastic panel. Curing of the coating composition is normally effected at temperatures below the glass transition temperature of the plastic being coated. The glass transition temperature is determined in conformity with DIN 7742. With very fast cures, it may be possible to do the coating also at temperatures above the glass transition temperature of the polymer. To exclude polymerization-inhibiting oxygen, polymerization is carried out under an inert gas, for example nitrogen. The curing time may range from 5 to 600 seconds, for example, and will depend on the temperature within the coating composition, which in turn is determined by the temperature of the substrate being coated, among other factors. The optimum curing temperature of the coating applied to different polymers may be below or above 100° C., the pertinent temperature range extending from about 50° C. to 200° C. As a rule, the maximum curing temperature which the substrate will stand will be chosen since particularly good adhesion and scratch resistance are then obtained. A cure effected at the highest possible temperature and in the shortest possible time, for example 10 seconds, is not only economically advantageous (faster process) but also results in significantly better scratch resistance than a long curing time at low temperature.

As a rule, the energy required for the cure is supplied to the monomer film by infrared emitters. It is most desirable to adjust the output of the emitters so that the substrate surface is heated to as high a temperature as possible, which may under certain conditions even be above the glass transition temperature of the substrate. However, the curing of the monomers by dipping the coated article into a heated liquid is particularly advantageous. Uniform curing of the scratch resistant film is thus secured even in the case of irregularly shaped injection molded parts. This approach also makes it possible to dispense with the costly inert gas atmosphere.

The curing of the scratch resistant film by dipping into an inert liquid, for example a highly concentrated salt solution that is a poor solvent for the polyfunctional monomers, can also be carried out by incorporating, in the inert liquid, a redox component for the peroxide present in the monomer film.

In view of the very high reactivity of the initiator/monomer mixtures in accordance with the invention, it is advisable to use the smallest possible amounts of the substances, especially in preliminary tests.

A better understanding of the invention and of its many advantages will be had by referring to the following Examples, given by way of illustration.

The evaluation criteria used in the Examples are set forth below.

Evaluation Criteria for Scratch Resistance

Optical evaluation: See data in Examples.
Scratch resistance:
  Rating 1 (very good scratch resistance): No scratches even when the surface is rubbed vigorously with 00 steel wool.
  Rating 2 (good scratch resistance): Very few scratches even when the surface is rubbed vigorously with 00 steel wool.
  Rating 3: Scratch resistant only when rubbed lightly with 00 steel wool.
  Rating 4: Scratch resistance comparable to that of the substrate.
  Rating 5: Coating is less scratch resistant than the substrate.
Adhesion: The cured film is crosshatched with a sharp blade (six horizontal and six vertical lines, spaced about 1.5 mm apart) and then an adhesive tape ("Tesa" film) is applied to it without air bubbles. Then the tape is pulled off in a single quick motion at a 90-degree angle. This test is repeated three times.
Evaluation:
  No detachment whatever even after a thrice repeated tear test: Adhesion very good.
  Very little fraying at the intersections even after a thrice repeated tear test: Adhesion adequate.
  Detachment only in less than 10 percent of the crosshatched area even after a thrice repeated tear test: Partial detachment.
  Detachment in more than 50 percent of the crosshatched area after a thrice repeated tear test: Complete detachment.

EXAMPLE 1

A wet film about 10 microns thick of a mixture having the following composition is applied with a doctor blade to an extruded polycarbonate panel (e.g. "Makrolon 281") 3 mm thick:
  1 g of pentaerythritol tetraacrylate,
  4 g of trimethylolpropane triacrylate,
  2 g of methyl ethyl ketone, and
  0.1 g bis(4-t-butylcyclohexyl)peroxydicarbonate (corresponding to 2%, based on the monomer mixture).

The applied film is deaerated for about 10 seconds under an inert gas atmosphere (nitrogen or argon) and then cured under an inert gas with a medium wave infrared emitter (about 40 kw/m$^2$) in about 15 seconds.

A scratch resistant polycarbonate panel with excellent optical proprties is obtained. The adhesion of the scratch resistant film to the polycarbonate is very good. (See also Table 1.) This composition and those of Example 2-22 do not contain any UV stabilizer and are offered to show the influences of the initiator on scratch resistance.

EXAMPLES 2 TO 5

Influence of the amount of initiator on scratch resistance

The scratch resistant coating is applied as described in Example 1, but the amount of initiator used is varied. It is apparent that under these curing conditions very good scratch resistance is obtained with 1 to 5 percent by weight of the initiator of Example 1. Adequate scratch resistance is obtained even with 0.5 percent of initiator. (See Table 1.)

EXAMPLES 6 TO 14

Influence of type of initiator on scratch resistance

The scratch resistant coating is applied as described in Example 1 but the nature of the initiator used (in amounts of 2 percent by weight in all cases) is varied. As a rule, the curing time is 20 seconds. Initiators which do not give adequate scratch resistance in this curing time in some cases show slightly better scratch resistance when the curing time is somewhat lengthened; however, the extended curing time results in damage in the substrate. (See Table 2.)

EXAMPLE 15

The same procedure is followed as in Example 1, except that the curing conditions are changed.
Composition of mixture:
  1 g of pentaerythritol tetraacrylate,
  4 g of trimethylolpropane triacrylate,
  2 g of methyl ethyl ketone, and
  0.2 g bis(4-t-butylcyclohexyl)peroxydicarbonate.

After deaeration under nitrogen, curing is performed for 100 seconds in a nitrogen current by exposure to a long wave infrared emitter (25 kw/m$^2$).

A highly scratch resistant polycarbonate panel with outstanding optical properties is obtained.
Scratch resistance: Rating 1.
Adhesion: Very good.

EXAMPLE 16

The same procedure is followed as in Example 15, except that a different monomer composition is chosen:
  1 g of pentaerythritol tetraacrylate and
  4 g of trimethylolpropane trimethylacrylate.
Curing is performed as described in Example 15.
The scratch resistance of the coating is much inferior to that of Example 15: Rating 3.

EXAMPLE 17

The same procedure is followed as in Example 15, except that a different monomer composition is chosen:
  5 g of trimethylolpropane trimethacrylate.
The scratch resistance of the coating is not better than that of the substrate: Rating 4.

EXAMPLE 18

The same procedure is followed as in Example 1, except that a different monomer composition is chosen:
  0.5 g of acrylic acid,
  1.0 g of pentaerythritol tetraacrylate, and
  3.5 g of trimethylolpropane triacrylate.
A highly scratch resistant polycarbonate panel with outstanding optical properties is obtained.
Scratch resistance: Rating 1-2.
Adhesion of scratch resistant coating to substrate: Very good.

EXAMPLE 19

The same procedure is followed as in Example 1, except that a different monomer composition is chosen and the solvent is dispensed with:
  2 g of pentaerythritol tetraacrylate and
  3 g of hexanediol diacrylate.

Thickness of wet film: 6 micron
Scratch resistance: Rating 4.

EXAMPLE 20

The same procedure is followed as in Example 19, except that coating thickness is increased.

Thickness of wet film: 36 microns

A polycarbonate panel provided with a scratch resistant costing and possessing outstanding optical properties is obtained.

Adhesion: Very good.
Scratch resistance: Rating 1.

Especially in the case of less highly crosslinked scratch resistant coatings, the coating must be of sufficient thickness.

EXAMPLE 21

The same procedure is followed as in Example 20, that is the coating thickness is also 36 microns; however, the monomer composition is different:
2 g of pentaerythritol tetraacrylate,
2.5 g of hexanediol diacrylate, and
0.5 g of acrylic acid.

A highly scratch resistant polycarbonate panel with outstanding optical properties is obtained.

Scratch resistance: Rating 1-2.
Adhesion of coating to substrate: Very good.

EXAMPLE 22

The same procedure is followed as in Example 21, except that 0.5 g of cyclohexyl methacrylate is used in place of the 0.5 g of acrylic acid. A polycarbonate panel is obtained that has poor scratch resistance. Scratch resistance: Rating 3.

EXAMPLE 23

The same procedure is followed as in Example 1, except that a different monomer mixture which includes a polymerizable UV stabilizer is used.

Composition of mixture:
1 g of pentaerythritol tetraacrylate,
3.95 g of trimethylolpropane triacrylate,
0.05 g of 3-(2-benzotriazolyl)-2-hydroxy-5-tertoctyl-benzyl methacrylamide,
2 g of methyl ethyl ketone, and
0.2 g of bis(4-t-butylcyclohexyl)peroxydicarbonate.

A highly scratch resistant polycarbonate panel with outstanding optical properties is obtained. The adhesion of the scratch resistant film to the polycarbonate is very good.

Scratch resistance: Rating 1.

EXAMPLE 24

The same procedure is followed as in Example 23, except that a larger amount of the UV absorber, which can be incorporated by polymerization, is used, namely,
0.25 g of 3-(2-benzotriazolyl)-2-hydroxy-5-tertoctyl-benzyl methacrylamide. The rest of the recipe is unchanged.

The adhesion of the scratch resisant film to the polycarbonate is very good.

Scratch resistance: Rating 1-2.

EXAMPLE 25

The same procedure is followed as in Example 1, except that 0.05 g of 2-hydroxy-4-methoxybenzophenone is added and the amount of the initiator is increased from 0.1 g to 0.2 g, the recipe being otherwise unchanged.

A scratch resitant polycarbonate panel with outstanding optical properties is obtained. The adhesion of the scratch resistant film to the polycarbonate is very good.

Scratch resistance: Rating 1-2.

EXAMPLE 26

A polypropylene panel measuring 20 cm × 20 cm and 3 mm thick is polished. Then a wet film about 20 microns thick of the following composition is applied to it as described in Example 1:
96% of trimethylolpropane triacrylate and
4% of bis(4-t-butylcyclohexyl)peroxydicarbonate The wet film is covered with a protective foil and cured in a circulating air oven at 100° C. A highly scratch resistant panel with outstanding optical properties is obtained.

The adhesion of the scratch resistant film is very good.

Scratch resistance: Rating 1.

EXAMPLE 27

Curing of the scratch resistant film by dipping into an inert heated liquid

A polycarbonate panel is coated as described in Example 26 and then cured within three minutes by dipping into a solution, heated to 95° C., of 50 percent by weight of potassium aluminum sulfate dodecahydrate in water.

Adhesion: Very good.
Scratch resistance: Rating 2.

EXAMPLE 28

A polypropylene panel according to Example 26 is flame conditioned. Then a mixture composed of
38 wt. % of pentaerythritol tetraacrylate,
7 wt. % of trimethylolpropane triacrylate,
4.5 wt. % of methacrylic acid,
2.5 wt. % of bis(4-t-butylcyclohexyl)peroxydicarbonate,
16 wt. % of methyl ethyl ketone,
16 wt. % of 1-hexanol, and
16 wt. % of diacetone alcohol, is spray coated onto it and cured.

Adhesion: Very good.
Scratch resistance: Rating 1.

EXAMPLE 29

The scratch resistant coating composition in Example 1 is used but it is applied by a different technique (dipping).

Substrate: High molecular weight polymethyl methacrylate ("Plexiglas GS 233").

The coating is cured by infrared radiation.
Optical properties: Outstanding.
Adhesion: Very good.
Scratch resistance: Rating 1.

EXAMPLE 30

The monomer composition and coating technique of Example 1 are used, but the substrate is a 3 mm thick injection molded sheet of a methyl methacrylate copolymer having a higher heat distortion temperature, specifically a copolymer comprising 75 percent by weight of methyl methacrylate, 14 percent by weight of alpha-methylstyrene, 7 percent by weight of maleic acid anhydride, and 4 percent by weight of methyl acrylate.

Evaluation immediately after curing and after 3000 hours of accelerated weathering:

Optical properties: Outstanding.
Scratch resistance: Rating 1.
Adhesion: Very good.

EXAMPLE 31

The same procedure is followed as in Example 1, except that other substrates (polystrene and rigid polyvinyl chloride, dyed a subdued red) are used. In both cases, very well adhering coatings with outstanding optical properties are obtained without any preliminary treatment.

Scratch resistance: Rating 1.

TABLE 1

Influence of Amount of Initiator on Resistance to Scratching

| Example | Amount of Initiator Used (wt. %) | Evaluation of Resistance to Scratching (Rating) |
| --- | --- | --- |
| 2 | 5 | 1 |
| 1 | 2 | 1 |
| 3 | 1 | 1 |
| 4 | 0.5 | 2 |
| 5 | 0.25 | 3 |

TABLE 2

Influence of Type of Initiator on Resistance to Scratching

| Example | Designation of Initiator (2% by weight; hardening time about 20 seconds) | Evaluation of Resistance to Scratching (Rating) |
| --- | --- | --- |
| 1 | Bis(4-t-butylcyclohexyl) peroxydicarbonate | 1 |
| 6 | Bis-cyclohexyl peroxydicarbonate | 1 |
| 7 | Bis(2-ethylhexyl) peroxydicarbonate | 1 |
| 8 | 2,2'-Azobis-(isobutyronitrile) | 4 |
| 9 | tert-Butyl peroctoate | 3-4 |
| 10 | tert-Butyl peroxypivalate | 5 |
| 11 | tert-Butyl peroxyneodecanoate | 4-5 |
| 12 | Dibenzoyl peroxide | 5 |
| 13 | Dilauroyl peroxide | 3-4 |
| 14 | Mixture of 1 part bis(4-t-butylcyclohexyl) peroxydicarbonate and 3 parts 2,2'-azobis-(isobutyronitrile) | 1-2 |

What is claimed is:

1. A method for making a scratch resistant and weather resistant coating on a shaped article which comprises applying to said article a coating of a mixture comprising a monomer capable of undergoing free radical polymerization and containing at least two polymerizable ethylenic bonds, either alone or in admixture with at least one other monomer having a polymerizable ethylenic bond, an aliphatic peroxydicarbonate initiator having a half-life of less than two minutes at 100° C., and a stabilizer against ultraviolet light, and then curing said coating by heating it to a temperature over 70° C.

2. A method as in claim 1 wherein said article is a thermoplastic or thermoplastic synthetic resin.

3. A method as in claim 1 wherein at least 30 percent by weight of said monomer having at least two ethylenic bonds has at least three such bonds.

4. A method as in claim 1 wherein at least 70 percent by weight of said monomers containing at least two ethylenic bonds are acrylate monomers.

5. A method as in claim 1 wherein said ultraviolet stabilizer is one capable of being incorporated into the polymer by polymerization.

6. A method as in claim 1 wherein said mixture comprises up to 30 percent by weight of a member selected from the group consisting of acrylic acid and methacrylic acid.

7. A method as in claim 1 wherein curing is carried out by heating in an inert gas atmosphere.

8. A method as in claim 1 wherein curing is carried out by dipping the coated article into an inert liquid.

9. A method as in claim 1 wherein said article consists of a polycarbonate, or of polymethyl methacrylate, or of a copolymer containing at least 60 percent by weight of methyl methacrylate.

10. A method as in claim 1 wherein said article has been shaped by extrusion.

11. A method as in claim 1 wherein said article has been shaped by injection molding.

* * * * *

UNITED STATES PATENT AND TRADEMARK OFFICE
CERTIFICATE OF CORRECTION

PATENT NO. : 4,814,207
DATED : March 21, 1989
INVENTOR(S) : Werner Siol, Erwin Felger, and Werner Arnold It is certified that error appears in the above-identified patent and that said Letters Patent is hereby corrected as shown below:

Column 6, line 14, replace "hydroge" by -- hydrogen --.

Column 7, line 38, replace "ae" by -- are --.

Column 14, line 26, this line should read -- thermoplastic or thermoelastic synthetic resin. --.

Signed and Sealed this

Tenth Day of April, 1990

Attest:

HARRY F. MANBECK, JR.

*Attesting Officer*    *Commissioner of Patents and Trademarks*